United States Patent
Cambon et al.

(10) Patent No.: US 10,245,891 B2
(45) Date of Patent: Apr. 2, 2019

(54) EVOLVING TREAD FOR A TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Stephanie Cambon, Clermont-Ferrand (FR); Jonathan Lejeune, Clermont-Ferrand (FR); Damien Bardin, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 345 days.

(21) Appl. No.: 15/104,172

(22) PCT Filed: Dec. 9, 2014

(86) PCT No.: PCT/EP2014/077088
§ 371 (c)(1),
(2) Date: Jun. 13, 2016

(87) PCT Pub. No.: WO2015/086622
PCT Pub. Date: Jun. 18, 2015

(65) Prior Publication Data
US 2016/0318348 A1 Nov. 3, 2016

(30) Foreign Application Priority Data
Dec. 13, 2013 (FR) ...................................... 13 62635

(51) Int. Cl.
*B60C 11/03* (2006.01)
*B60C 11/13* (2006.01)

(52) U.S. Cl.
CPC ...... *B60C 11/0323* (2013.01); *B60C 11/1307* (2013.01); *B60C 2011/1338* (2013.01); *B60C 2200/06* (2013.01)

(58) Field of Classification Search
CPC . B60C 11/0332; B60C 11/033; B60C 11/032; B60C 11/0323; B60C 11/1281;
(Continued)

(56) References Cited

U.S. PATENT DOCUMENTS 2,322,505 A * 6/1943 Bull ........................ B60C 11/04
152/209.21
2,696,863 A * 12/1954 Ewart ................. B60C 11/0309
152/209.21
(Continued)

FOREIGN PATENT DOCUMENTS

DE 4403662 * 8/1995
EP 0 989 000 A2 3/2000
(Continued)

*Primary Examiner* — Eric Hug
(74) *Attorney, Agent, or Firm* — Dickinson Wright PLLC

(57) ABSTRACT

A tread for a heavy vehicle tire of total thickness PMU this tread when new having a tread surface is provided and disclosed herein. The tread includes at least one cut opening in the initial condition onto the tread surface, this cut being such that it includes an external part having the form of a groove in the main direction, this groove having a mean depth Pe less than 80% of the thickness PMU, an internal part forming the bottom of the cut, this internal part having the shape of a channel of mean width Le and mean height He, this channel being intended to form a new continuous groove when the part wear of the tread reaches at most 80% of the thickness PMU.

9 Claims, 2 Drawing Sheets

(58) Field of Classification Search
CPC ..... B60C 2011/0365; B60C 2011/0353; B60C 2011/0381; B60C 2011/0383; B60C 11/02; B60C 2200/06; B60C 2200/065; B60C 2200/08
USPC ............... 152/209.17, 209.18, 209.26, 154.2
See application file for complete search history.

(56) References Cited

U.S. PATENT DOCUMENTS

| | | | | |
|---|---|---|---|---|
| 5,022,448 | A | * | 6/1991 | Ochiai .................... B60C 11/01 |
| | | | | 152/209.16 |
| 6,119,744 | A | * | 9/2000 | Tsukagoshi ......... B60C 11/0309 |
| | | | | 152/209.19 |
| 8,939,183 | B2 | | 1/2015 | Barraud et al. |
| 2003/0201048 | A1 | * | 10/2003 | Radulescu ......... B29D 30/0606 |
| | | | | 152/209.25 |
| 2013/0061993 | A1 | * | 3/2013 | Mathonet .............. B60C 11/042 |
| | | | | 152/209.22 |

FOREIGN PATENT DOCUMENTS

| | | |
|---|---|---|
| FR | 2 940 185 A1 | 6/2010 |
| WO | 2011/039194 A1 | 4/2011 |
| WO | WO 2013/002801 * | 1/2013 |

* cited by examiner

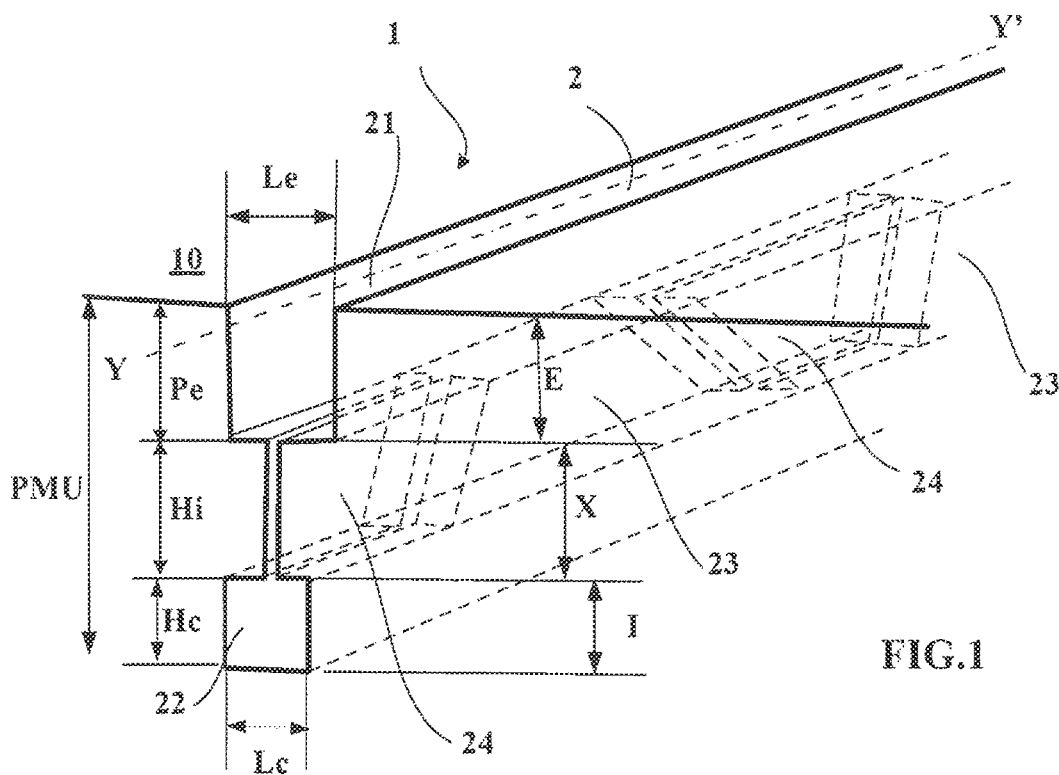
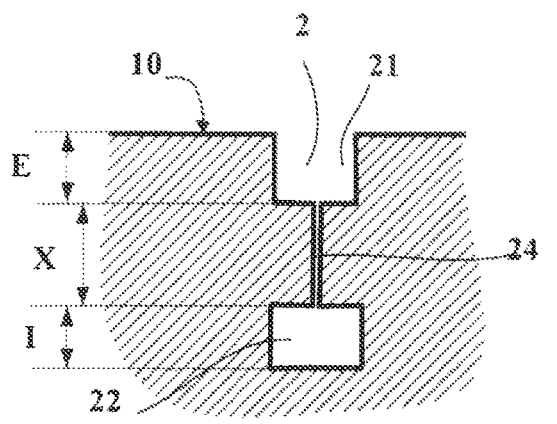 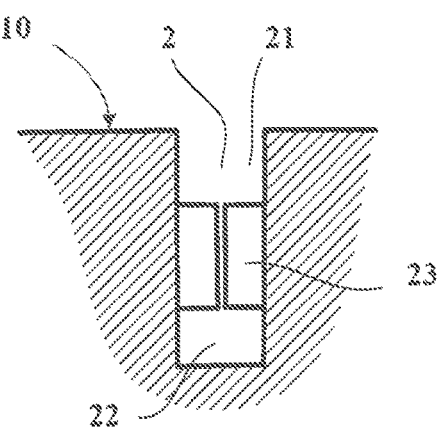
FIG. 2A    FIG. 2B

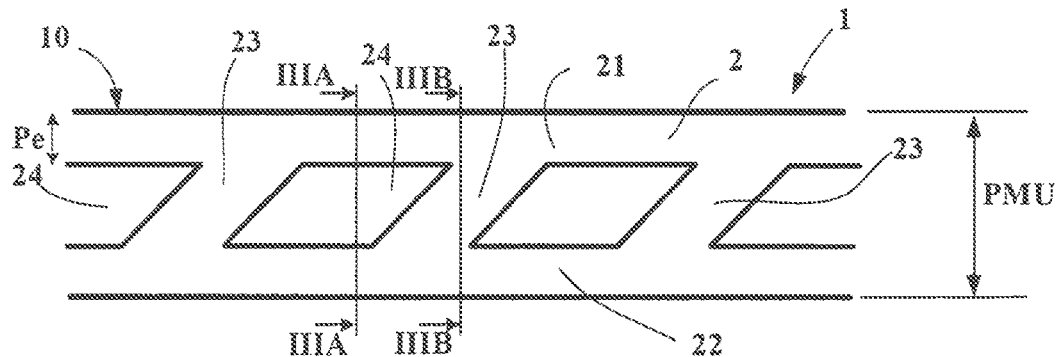
FIG. 3
FIG. 3A   FIG. 3B
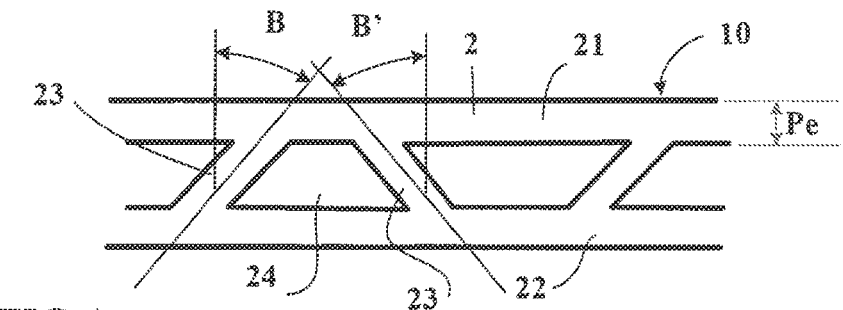
FIG. 4
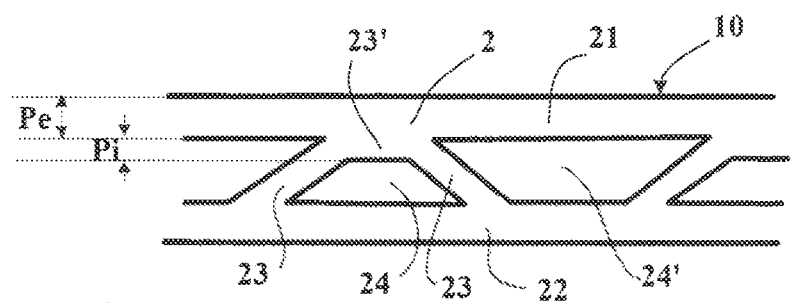
FIG. 5

EVOLVING TREAD FOR A TIRE

CROSS-REFERENCE TO RELATED APPLICATIONS

This application is a 371 national phase entry of PCT/EP2014/077088, filed 9 Dec. 2014, which claims the benefit of French Patent Application No. 1362635, filed 13 Dec. 2013, the contents of which are incorporated herein by reference for all purposes.

BACKGROUND

The disclosure relates to treads for tires and more particularly to the designs of the tread pattern for these treads and to the tires provided with such treads which have a lasting ability to drain away standing water present on a roadway in terms of wet weather, these treads having improved running performance.

As is known, wet weather driving conditions require the most rapid possible elimination of the water from the contact patch in which each tire is in contact with the roadway so as to ensure that the tread makes contact with the roadway. Water that is not pushed over the front of the tire flows partially along the grooves and sipes formed in the tire tread, whether these grooves and sipes be oriented in the circumferential direction or the transverse direction or even an oblique direction.

A cut refers to any cavity created in a tread by molding, this cut extending in a main direction and into the depth of the tread.

A groove here means a cut that opens onto a tread surface intended to be in contact with the roadway, this void having a mean width such that the walls of material delimiting it are never in contact with one another under the normal service conditions of the tire.

A sipe here means a thin slit having a mean width that is small and such that, under normal tire service conditions, the walls of material delimiting it may at least partially come into contact with one another when that sipe is in the contact patch in which the tire is in contact with the roadway.

The thickness of material to be worn away (denoted PMU) refers to the thickness of tread that can be worn away during running before the tread wear limit notably identified by wear indicators formed in the grooves is reached.

In the present description, the terms radial or radially are used to indicate a direction which, when considered on the tire, is a direction perpendicular to the axis of rotation of the tire whereas when considered on a tread alone, corresponds to the direction of the thickness of the said tread. Moreover, the term circumferential is used to indicate a direction which corresponds to a direction tangential to any circle centered on the axis of rotation of the tire. This same direction corresponds to the longitudinal direction of the tread, the latter being formed in the manner of a flat strip before it is incorporated at the time of manufacture of a tire.

Whatever the category of tire (namely whether it be a tire to be fitted to passenger vehicles or to a vehicle intended to carry heavy loads), the tread needs to have standing-water drainage performance that always remains above a minimum performance referred to as the safe performance. Accordingly, and given that the tread gradually wears away, progressively reducing the cross sections of the grooves and therefore the ability of these grooves to remove a volume of liquid, it is commonplace to produce grooves that open onto the tread surface when new and that extend into the thickness of the tread down to at least a level that corresponds to a legal limit that requires the tread to be withdrawn.

The disadvantage of creating a plurality of grooves in a tread is that it is the amount of tread material for a given width of tread and it therefore has an appreciable impact on the stiffness of the tread. As a result, in order to address the loadings experienced during running, those skilled in the art need to compensate for these reductions in stiffness by any means at their disposal, and notably by adapting the internal structure of the tire, something that is not without its own impact on the cost price of the tire itself. These reductions in stiffness may also adversely affect the wear rate, the evenness of this wear, and some of the expected aspects of performance during running.

Moreover, it is found that there is an increase in rolling resistance, which manifests itself in an appreciable increase in fuel consumption of vehicles fitted with such tires, as a result of an increase in hysteresis losses associated with the cycles of deformation of the rubbery material of which the tread is made.

Document WO 2011-039194 A1 has proposed forming in a tread grooves that have the particular feature of opening discontinuously onto the tread surface when new. This groove can be considered to be a groove that is wavy in the thickness of the tread opening regularly onto the tread surface. This type of wavy groove can be formed whether in the circumferential direction or in any other direction. As described in that publication, this type of groove is initially (when the tread is new) continuous so that when driving on a roadway covered in standing water, water can be picked up in those parts of the groove that open onto the tread surface as they enter the contact patch, the water thus picked up being drained along the wavy groove beneath the tread surface. The liquid thus picked up is then ejected outside of the contact patch under the effect of centrifugal forces. That same document describes the possibility, after the manner of tread pattern designs of the prior art, of making connections between at least two wavy grooves of this type.

SUMMARY

The present disclosure seeks to propose a new groove geometry that provides both excellent drainage of the water picked up in the contact patch, so as to make the necessary contact with the roadway while at the same time limiting the reduction in stiffness of the tread in order notably to reduce the hysteresis losses associated with the deformations of the tread pattern elements of the tread when they are in the contact patch.

The object of the disclosure is to provide a tread provided with cuts that make it possible to obtain performance that is equal or superior to the minimum safety performance in terms of water drainage, irrespective of the level of tread wear, at the same time obtaining performance in terms of rolling resistance that meets the present-day requirements of the heavy vehicle tire market.

To this end, one subject of the disclosure is a tread for a heavy vehicle tire of total wearing thickness PMU corresponding to the thickness of material that can be worn away during running and of width W, this tread when new having a tread surface intended to come into contact with a roadway when a tire provided with this tread is being driven on.

This tread comprising at least one cut opening in the initial condition (when the tread is new) onto the tread surface, this cut being characterized in that it comprises:

an external part having the form of a groove in the main direction, this groove opening onto the tread surface when new and having, on this tread surface when new, a width Le such that it does not close up in the contact patch and a mean depth Pe less than 70% of the wearing thickness PMU, more preferably less than 50% of this thickness PMU;

an internal part forming the bottom of the cut, this internal part having the shape of a channel of mean width Le and mean height He, this channel being intended to form a new continuous groove when the part wear of the tread reaches at most 80% of the wearing thickness PMU;

an intermediate part making the connection between the internal part and the external part, this intermediate part comprising an alternation—in the main direction of the groove that forms the external part, a succession of wide parts and of narrow parts, the wide parts being such that they do not close when they enter the contact patch and the narrow parts being such that they do close when they enter the contact patch, thus limiting the reduction in stiffness of the tread caused by the presence of this cut.

For preference, the channel of the internal part may be revealed once the part wear reaches at least 50% of the thickness PMU;

For preference, the mean width Le of the channel is at least equal to 20% of the width of the surface area of the groove of the external part, and more preferentially still, at least equal to 75% of the surface width of the groove of the external part. For preference, the mean height He of this canal is at most 50% of the thickness PMU, more preferably still, at most 20% of the thickness PMU.

For preference, the intermediate part has a height Hi which is at least equal to 10% of the thickness PMU and more preferably still at least equal to 25%.

By virtue of this tread structure a void volume is obtained that is suited to achieving satisfactory drainage when new, and also regardless of the level of wear while at the same time limiting the reduction in tread stiffness when new.

In order to increase the stiffness of the tread according to the disclosure, it is advantageous for the narrow parts of the intermediate part to be provided with means of mechanically blocking the relative movements of the opposing walls that delimit the said narrow parts. Such means may adopt the form of waviness of the opposing walls or alternatively of reliefs molded onto the said walls and suited to collaborating with one another. These same walls may have a surface roughness suited to opposing the slippage of one wall against the other.

In one alternative form of the disclosure, the wide parts of the intermediate part form oblique channels connecting the external groove part to the internal channel part, these wide parts not being connected to one another, namely being disjointed from one another.

In another alternative form, these wide parts form oblique channels and are oriented in one and the same direction making the mean angle greater than zero degrees with the direction perpendicular to the tread surface when new. Of course, it is possible to adapt the angle of the oblique parts and even to provide different angles for each of the channels.

The disclosure also relates to a tire provided with a tread defined in accordance with the disclosure, this tread surmounting radially on the outside a tire casing made up of a carcass reinforcement and of a crown reinforcement. The tread of this tire is created in accordance with one of the alternative forms of embodiment described hereinabove, certain dimensions being connected with the mean length of the area of contact of the tread with the roadway under the nominal service conditions of the tire, these nominal service conditions being defined notably in the regulations of the E.T.R.T.O. or of the J.A.T.M.A. or even of the T.R.A. Such may notably be the case in respect of the lengths of the narrow parts and of the wide parts of the intermediate part: specifically, it is sensible for there always to be a wide part in the contact patch in order to ensure satisfactory drainage of any standing water on the roadway.

Further features and advantages of the disclosure will become apparent from the description given hereinafter with reference to the attached drawings which show one nonlimiting embodiment of the subject matter of the disclosure.

BRIEF DESCRIPTION OF THE FIGURES

FIG. 1 is a partial view of a tread comprising a cut according to the disclosure;

FIGS. 2A, 2B show cross sections on two planes perpendicular to the plane of FIG. 1 and the respective lines of which are indicated by lines IIA-IIA and IIB-IIB.

FIG. 3 shows a view in cross section in the main direction of an alternative form of a cut according to the disclosure;

FIGS. 3A, 3B show cross sections on two planes perpendicular to the plane of FIG. 3 and the respective lines of which are indicated by the lines IIIA-IIIA and IIIB-IIIB;

FIG. 4 is a view in cross section in the main direction of another alternative form of cut according to the disclosure;

FIG. 5 is a view in cross section in the main direction of another alternative form of a cut according to the disclosure.

To make the figures easier to understand, identical reference signs are used to denote alternative forms of embodiment of the disclosure where these reference signs refer to elements of the same kind, whether structurally or functionally.

DETAILED DESCRIPTION

FIG. 1 is a partial view of a tread 1 comprising a cut 2 according to the disclosure, this cut 2 extending in a main direction indicated in the figure by the direction YY'. This tread 1 is intended to be fitted to a tire of size 315/70R22.5.

This cut 2 is formed in a tread 1 having a tread surface 10 when new that is intended to come into contact with the roadway when a tire provided with the said tread is being driven on. This cut 2 opens in the initial condition (namely when the tread is new and has not yet become worn) onto the tread surface 10. The tread has a thickness of material that can be worn away during running, PMU, equal in this instance to 14.5 mm, which is the thickness beyond which it is necessary to renew the tread either by retreading or by replacing the tire.

This cut 2 comprises several parts in its depth, namely:

an external part E having the form of a groove 21 opening onto the tread surface 10 when new, this groove having a mean depth Pe here equal to 7.4 mm (7.4/14.5=51%) and a width Le equal to 4.3 mm on the surface of the tread when new;

an internal part I forming the part of the cut 2 furthest towards the inside of the tread 1, this internal part I having the form of a continuous channel 22 having a mean width Le equal to 3.5 mm and a mean height He equal to 3.5 mm; this channel has a cross section of substantially circular shape with a diameter equal to 3.5 mm. This channel 22, which is continuous in the main direction of the cut, is intended to form a new groove after the tread has become part worn;

an intermediate part X placing the internal part and the external part E of the cut 2 in communication, this intermediate part X comprising, alternating in the main direction of the cut, a succession of wide parts 23 and of narrow parts 24, the wide parts 23 being dimensionally suited to not closing up when they enter the contact patch in which the tire is in contact with the roadway during running and the narrow parts 24 being suited to closing up when they enter the contact patch, thus limiting the reduction in stiffness of the tread 1 caused by the presence of this cut 2. This intermediate part has a height Hi equal to 4.6 mm.

In the example given, the narrow parts are sipes with a mean width of 0.6 mm and the wide parts have a mean width of 3.5 mm so that they are inscribed in the continuity both of the internal groove and of the internal channel.

The void volume of the cut 2 as shown and described is far smaller than the void volume of a groove of similar dimensions combining the external and internal parts while at the same time ensuring complete continuity between these two parts. With this cut according to the disclosure, standing water present on the roadway in wet weather is drained away when the tire is new both along the groove 21 of the external part E and along the channel 22 which is in communication with this groove 21 via the wide parts 23 of the intermediate part of the cut 2.

When tread wear has completely worn away the groove 21 of the external part the wide parts 23 open onto the new tread surface and their connection with the channel 22 still provides sufficient drainage. It is of course within the competence of the person skilled in the art to provide a sufficient drainage volume once tread wear reaches the channel 22, which channel forms, on the new tread surface, a groove that is completely open onto this tread surface.

By virtue of this tread structure, a void volume is obtained that is suited to achieving satisfactory drainage when new regardless of the level of wear while at the same time limiting the reduction in tread stiffness when new.

FIGS. 2A, 2B show cross sections on two planes perpendicular to the plane of FIG. 1 and the respective lines of which are indicated by the lines IIA-IIA and IIB-IIB.

FIG. 3 is a view in cross section in the main direction of an alternative form of the embodiment of a cut according to the disclosure. This FIG. 3 shows a groove 21 opening onto the tread surface 10 when a tread 1 is new. This groove 1 is in communication in the depth of the tread with a channel 22 that is continuous in the main direction of the cut via an intermediate part X, the latter being formed by a plurality of wide parts 23 and narrow parts 24. The wide parts 23 of the intermediate part X have the shape of channels oriented obliquely all in one and the same direction A considered with reference to a direction perpendicular to the tread surface. In this particular instance, this orientation is of the order of 45 degrees. These channels 23 have dimensions suited to placing the groove 21 of the external part in communication with the channel 22 of the internal part. Placing in communication here means that the cross section of each channel 23 of the intermediate part is suited to allowing liquid to circulate from the groove towards the channel.

FIGS. 3A, 3B show cross sections on two planes perpendicular to the plane of FIG. 3 and the respective lines of which are indicated by lines IIIA-IIIA and IIIB-IIIB.

It can be seen from these two cross sections that the narrow parts 24 of the intermediate part of the cut depicted have the form of sipes zigzagging into the depth in order to provide mechanical blocking, something which is favorable to reducing the reduction in stiffness of the tread caused by the presence of the cut.

FIG. 4 shows a view in cross section in the main direction of another alternative form of a cut according to the disclosure. This alternative form differs from the alternative form shown in FIG. 3 in that the wide parts 23 form oblique channels which in alternation have different orientations B and B to a direction perpendicular to the tread surface 10; in this particular instance, these angles take the values +45 degrees and −45 degrees. These oblique channels 23 connect the external groove 21 to the channel 22. Moreover, sipes 24 are formed so that they can be connected to the external groove and to the channel and to the oblique channels.

In this alternative form, the oblique channels all extend from one and the same depth Pe measured in relation to the tread surface 10.

FIG. 5 shows a view in cross section on the main direction of another alternative form of a cut 2 according to the disclosure. According to this alternative form, the narrow parts 24, 24' of the intermediate part of the cut 2 alternate in having (which means to say that one in two has) a reduced height. It is as if the oblique parts 23 were joined together by parts 23', the latter having a depth Pi measured from a depth Pe. This then creates a kind of wavy groove with waviness from the depth Pe onwards.

Whatever the alternative form of the disclosure is considered, the presence of the Sipes forming the narrow parts makes molding and demolding easier.

The disclosure is not restricted to the examples described and various modifications can be made thereto without departing from the scope as defined in the claims. In particular, a cut as described may be oriented in any orientation adopted on a tread whether this be the circumferential direction corresponding to the direction of travel or the transverse direction or even an oblique direction. Moreover, it should be noted that the parts forming oblique channels can be bounded by planar surfaces as has been shown in the alternative forms depicted, or by curve surfaces.

The invention claimed is:

1. A tread for a heavy vehicle tire of total wearing thickness PMU corresponding to a thickness of material worn away during running, the tread having a tread surface in contact with a roadway, the tread including at least one cut opening in the initial condition onto the tread surface, the cut comprising:
   an external part having the form of a groove extending continuously in the main direction of the cut, the groove opening onto the tread surface when new and having, on this tread surface, a width Le such that it does not close up in the contact patch and a mean depth Pe less than 70% of the thickness PMU;
   an internal part forming the bottom of the cut, this internal part having the shape of a channel of mean width Lc and mean height Hc, the channel extending continuously in the main direction of the cut for forming a new continuous groove when the part wear of the tread reaches at most 80% of the thickness PMU;
   an intermediate part making a connection between the internal part and the external part, the intermediate part including an alternation—in the main direction of the groove that forms the external part, a succession of wide parts and of narrow parts, the wide parts not closing when they enter the contact patch and the narrow parts closing when they enter the contact patch, thus limiting the reduction in stiffness of the tread caused by the presence of this cut,
   the tread being characterized in that the wide parts of the intermediate part form oblique channels connecting the external groove part to the internal channel part, these wide parts being disjointed from one another.

2. The tread according to claim 1, wherein the channel of the internal part is revealed once the part wear reaches at least 50% of the thickness PMU.

3. The tread according to claim 1, wherein the mean width Lc of the channel is at least equal to 20% of the width Le of the surface area of the groove of the external part.

4. The tread according to claim 1, wherein the mean height Hc of the channel of the internal part is at most equal to 50% of the thickness PMU.

5. The tread according to claim 1, wherein the mean height Hc of the channel of the internal part is at most equal to 20% of the thickness PMU.

6. The tread according to claim 1, wherein the intermediate part has a height Hi which is at least equal to 10% of the thickness PMU.

7. The tread according to claim 1, wherein the narrow parts of the intermediate part are provided with means of mechanically blocking the relative movements of the opposing walls that delimit the said narrow parts.

8. The tread according to claim 1, wherein the tire is configured to be fit on to a heavy vehicle.

9. The tread according to claim 3, wherein the mean width Lc of the channel is at least equal to 75% of the width Le of the surface area of the groove of the external part.

\* \* \* \* \*